United States Patent
Michel

(10) Patent No.: US 12,434,942 B2
(45) Date of Patent: Oct. 7, 2025

(54) SECURITY DEVICE FOR BUILDING-RELATED PASSENGER CONVEYOR SYSTEM

(71) Applicant: Inventio AG, Hergiswil (CH)

(72) Inventor: David Michel, Rotkreuz (CH)

(73) Assignee: INVENTIO AG, Hergiswil (CH)

( * ) Notice: Subject to any disclaimer, the term of this patent is extended or adjusted under 35 U.S.C. 154(b) by 1053 days.

(21) Appl. No.: 17/593,300

(22) PCT Filed: Mar. 3, 2020

(86) PCT No.: PCT/EP2020/055515
§ 371 (c)(1),
(2) Date: Sep. 15, 2021

(87) PCT Pub. No.: WO2020/187554
PCT Pub. Date: Sep. 24, 2020

(65) Prior Publication Data
US 2022/0177270 A1    Jun. 9, 2022

(30) Foreign Application Priority Data

Mar. 18, 2019    (EP) ..................................... 19163412

(51) Int. Cl.
*B66B 5/00* (2006.01)
*G06F 8/658* (2018.01)
*G06F 9/455* (2018.01)

(52) U.S. Cl.
CPC .......... *B66B 5/0025* (2013.01); *B66B 5/0031* (2013.01); *B66B 5/0037* (2013.01);
(Continued)

(58) Field of Classification Search
CPC ... B66B 5/0025; B66B 5/0031; B66B 5/0037; B66B 5/0087; G06F 8/658;
(Continued)

(56) References Cited

U.S. PATENT DOCUMENTS

| 5,200,583 | A | 4/1993 | Kupersmith et al. |
| 6,170,614 | B1 * | 1/2001 | Herkel ...................... B66B 1/32 |
| | | | 187/287 |
| 2011/0302466 | A1 | 12/2011 | Ikawa et al. |

FOREIGN PATENT DOCUMENTS

| CN | 1295966 A | 5/2001 |
| CN | 102405184 A | 4/2012 |

(Continued)

*Primary Examiner* — Julio C. Gonzalez
(74) *Attorney, Agent, or Firm* — Patrick B. Horne; Shumaker, Loop & Kendrick, LLP

(57) ABSTRACT

A safety device for a building-related passenger transport system includes a microcontroller having a memory, a processor and a communication interface. A safety module is stored in the memory and, when it is executed on the processor, receives safety-relevant signals from components of the passenger conveyor system, evaluates the signals with regard to a safety problem and transmits a warning signal to a controller of the passenger conveyor system in the event of a safety problem. An update module is stored in the memory and, when it is executed on the processor, receives a software package via the communication interface and updates at least parts of the safety module with the software package. The microcontroller is configured such that the safety module is able to be amended only by the update module.

15 Claims, 4 Drawing Sheets

(52) U.S. Cl.
CPC .......... *G06F 8/658* (2018.02); *G06F 9/45558* (2013.01); *G06F 2009/4557* (2013.01); *G06F 2009/45583* (2013.01)

(58) Field of Classification Search
CPC ......... G06F 9/45558; G06F 2009/4557; G06F 2009/45583; G06F 8/656; G05B 2219/2659; G05B 19/0428
See application file for complete search history.

(56) References Cited

FOREIGN PATENT DOCUMENTS

| | | |
|---|---|---|
| CN | 204958039 U | 1/2016 |
| CN | 107636607 A | 1/2018 |
| DE | 60029312 T2 | 7/2007 |
| DE | 102016200711 A1 | 7/2017 |
| EP | 1621505 A1 | 2/2006 |
| EP | 2336070 A1 | 6/2011 |
| EP | 2916219 A1 | 9/2015 |
| WO | 2016180484 A1 | 11/2016 |

\* cited by examiner 22, 22' CENTRAL CONTROL UNIT  26 SAFETY SENSOR  36 SAFETY DEVICE
38 UPDATE MODULE  40, 40', 40" SAFETY MODULE  42 MICROCONTROLLER
44 DATA COMMUNICATION UNIT  48 PROVIDER

60 NON-VOLATILE MEMORY
62 VOLATILE MEMORY
64 BOOT LOADER

66 PRIVATE KEY
68 PUBLIC KEY
58 MEMORY
70 HYPERVISOR

38 UPDATE MODULE 40 SAFETY MODULE 42 MICROCONTROLLER
70 HYPERVISOR

SECURITY DEVICE FOR BUILDING-RELATED PASSENGER CONVEYOR SYSTEM

FIELD

The present invention relates to a safety device for a building-related passenger transport system and to a method for updating software of a safety device of this kind.

BACKGROUND

Building-related passenger conveyor systems, such as elevators, escalators, and moving walkways, are used to transport passengers within buildings. Elevator systems are used, for example, to make it possible to convey passengers between different floors within a building. For this purpose, an elevator car can in general be moved inside a usually vertical elevator shaft. In the case of escalators or moving walkways, passengers can be transported on step units along inclined or horizontal travel paths while standing.

In order to be able to ensure the safety of passengers, many building-related passenger conveyor systems have a safety device which receives signals from safety-relevant sensors, evaluates the signals, and which, if an unsafe state is determined, stops the building-related passenger transport systems by transmitting a corresponding signal to a controller of the building-related passenger conveyor systems. For example, switches are usually fitted to the doors of an elevator system, by means of which switches it can be checked whether the doors are closed. If not all doors are closed, the safety device prevents the elevator car from being able to be moved in the shaft, in order to prevent passengers from being trapped or falling into the shaft, for example.

Since safety devices are usually installed in large numbers, it can be desirable to be able to update a software of the safety device externally, for example via the internet. An external interface must also, however, be protected against unauthorized access. The complexity of safety devices, however, should be kept as low as possible in order to ensure that the safety functions are carried out correctly and at any time.

WO 2016/180484 A1 describes a method for updating software in a safety monitoring system of an elevator system.

SUMMARY

Overall, there may be a need for a simply structured safety device with a well-protected update function.

A need of this kind can be met by the subject matter of the advantageous embodiments set out in the following description.

One aspect of the invention relates to a safety device for a building-related passenger transport system. As already stated, a building-related passenger conveyor system can be an elevator system, an escalator system, or a moving walkway system.

According to one embodiment of the invention, the safety device comprises a microcontroller having a memory, a processor, and a communication interface. A microcontroller can comprise a semiconductor chip in which the above-mentioned components, i.e. the memory, the processor, and the communication interface, are implemented.

A safety module is stored in the memory and, when it is executed on the processor, receives safety-relevant signals from components of the passenger transport system, evaluates them with regard to a safety problem and transmits a warning signal to a controller of the passenger transport system in the event of a safety problem. The safety module and, in general, software modules, such as the update module described below, can be software components that contain instructions for the processor. For example, the software modules can be stored in a non-volatile part of the microcontroller.

The safety-relevant signals can originate from safety sensors of the building-related passenger transport systems, and/or can be transmitted, for example, via a bus to the safety device. The communication interface can communicate via this bus, for example. Safety sensors can generally be all types of sensors that detect safety-relevant information about components of the building-related passenger conveyor system. Examples of sensors of this kind are door closing sensors that detect whether an elevator door is properly closed. The safety device can be directly connected to a controller of the building-related passenger conveyor system that controls, for example, a drive and/or other actuators (such as door openers). If the safety module emits a warning signal, which can be transmitted to the controller, for example, via the bus, the controller can, for example, prevent the drive and/or the actuators from being operated.

Furthermore, an update module is stored in the memory of the microcontroller which, when it is executed on the processor, receives a software package via the communication interface and updates at least parts of the safety module with the software package.

The communication interface can, for example, be connected to the internet via one or a plurality of data communication devices, such as a router. The update module can receive the software package via the communication interface. Upon receipt, the safety module can check whether the provider or transmitter of the software is who it claims to be and/or can decrypt the software package or check whether the software package was corrupted during the transport thereof.

The microcontroller is also configured in such a way that the safety module is only, i.e. solely, able to be amended by the update module. In this way it can be prevented that a desired external access takes place via the communication interface on the safety module. The safety module can only be changed by means of the update module, which can check whether the changes, i.e. the received software package, originate from a desired source and whether it contains uncompromised instructions.

The processor has a first processor core on which the safety module is executed and a second processor core on which the update module is executed. The access of the second processor core is limited to regions of the memory in which the safety module is stored. The microcontroller can also be configured in such a way that only, i.e. solely, the second processor core, can access the region of the memory in which the safety module is stored. For example, the processor cores can have separate memories or separate memory regions.

According to one embodiment of the invention, the microcontroller comprises a hypervisor which restricts access by executed software modules to the memory. The hypervisor can restrict access of the update module to regions of the memory in which the safety module is stored. The hypervisor can be a hardware component of the microcontroller and/or can be a software module that is stored in the memory. The hypervisor regulates which software module and/or which processor core can and cannot access which memory regions of the memory. Furthermore, the hypervisor can regulate how and whether software modules are allowed to communicate with one another and/or whether they are allowed to access the communication interface.

According to one embodiment of the invention, the hypervisor is designed to forward the safety-relevant signals from components of the passenger transport system to the safety module and to forward the software package to the update module. The hypervisor can monitor the data communication of a software module via the communication interface. Specific data (such as the software package and the associated communication) are assigned to the update module, while other data (such as the safety-relevant signals and the warning signal) are assigned to the safety module. In this way it can be prevented, for example, that the update module generates a warning signal.

According to one embodiment of the invention, the update module receives the safety-relevant signals via the communication interface and forwards them to the safety module. The microcontroller can be configured so that only, i.e. solely, the update module can communicate via the communication interface. For example, the hypervisor can prevent communication between the safety module or a processor core on which the safety module is executed and the communication interface.

According to one embodiment of the invention, a plurality of safety modules are stored in the memory, the update module being designed to update these safety modules. It is possible for the microcontroller to map different safety functions with different safety modules. The microcontroller can be configured in such a way that the safety modules cannot influence one another. For example, the microcontroller can be configured in such a way that each safety module is assigned a memory region which the other safety modules are not allowed to access. The microcontroller can also be configured in such a way that the safety modules are not allowed to communicate with one another.

According to one embodiment of the invention, the memory comprises a non-volatile memory and a volatile memory. The non-volatile memory cannot be changed via the communication interface. In this non-volatile memory, for example a protected FLASH memory, data, such as the update modules, can be stored which are protected from being altered by means of an unauthorized access via the communication interface.

According to one embodiment of the invention, the update module is stored in the non-volatile memory in encrypted form. Furthermore, a boot loader module can be stored in the non-volatile memory which, when it is executed on the processor, decrypts the update module, and loads it into the volatile memory.

According to one embodiment of the invention, a private key for the safety device is stored in a protected, non-volatile memory of the microcontroller. A public key of a provider of the software package can also be stored in a protected, non-volatile memory of the microcontroller. These keys, which cannot be changed via the communication interface, can be used to decrypt the encrypted update module and/or an encrypted software package. The private key can be uniquely assigned to the safety device or the update module. Using the public key, the provider of a software package can be authenticated and/or data can be encrypted for the provider.

According to one embodiment of the invention, the software module is stored in unencrypted form in the non-volatile memory. Since the safety module is protected against unauthorized access from the outside, there is no need to implement internal data security measures for the safety modules.

A further aspect of the invention relates to a method for updating software of a safety device, as described above and in the following. For example, the method can be carried out by the processor or processors of the microcontroller. It is to be understood that features of the method can also be features of the safety device and vice versa.

According to one embodiment of the invention, the method comprises: authenticating a provider of the software package via the communication interface by the update module; receiving the software package via the communication interface by the update module; and updating at least a part of the safety module with the software package by the update module. The authentication can be carried out using a public key of the provider that is stored in the update module and/or a non-volatile memory of the microcontroller.

The software package can include a header that can only, i.e. solely, be decrypted with a private, individual key of the safety device and/or the update module. The private key can be stored in the update module and/or a non-volatile memory of the microcontroller. The header can contain information about the content of a further part of the software package, which, for example, can only be transmitted by the provider after the header has been received.

For example, the software package can only comprise changed components of the safety module which is to be updated, and the header can also indicate which parts of the safety module are to be replaced.

According to one embodiment of the invention, the method further comprises: decrypting the software package by means of the update module. The software package can also be decrypted using the private key. It is also possible, however, for at least part of the software package to be encrypted differently using the updated software.

According to one embodiment of the invention, the software package, or at least part of the software package, is encrypted using a symmetric encryption method, as defined for example in the AES (Advanced Encryption Standard). The temporary key for the symmetric encryption method can be exchanged with keys of an asymmetric encryption method, such as the above-mentioned public and private keys.

According to one embodiment of the invention, the method further comprises: regular requests for a software package by the update module from the provider. The updating software can take on the task of checking when a new software package is available. For this purpose, for example, an address stored in the update module and/or in a non-volatile memory of the microcontroller can be queried.

It should be understood that some of the possible features and advantages of the invention are described herein with reference to different embodiments. A person skilled in the art will recognize that the features can be suitably combined, adapted, or replaced in order to arrive at further embodiments of the invention.

Embodiments of the invention will be described in the following with reference to the accompanying drawings, although neither the drawings nor the description should be construed as limiting the invention.

The drawings are merely schematic and not to scale. Like reference signs refer to like or equivalent features in the various drawings.

DETAILED DESCRIPTION

Figure 1:
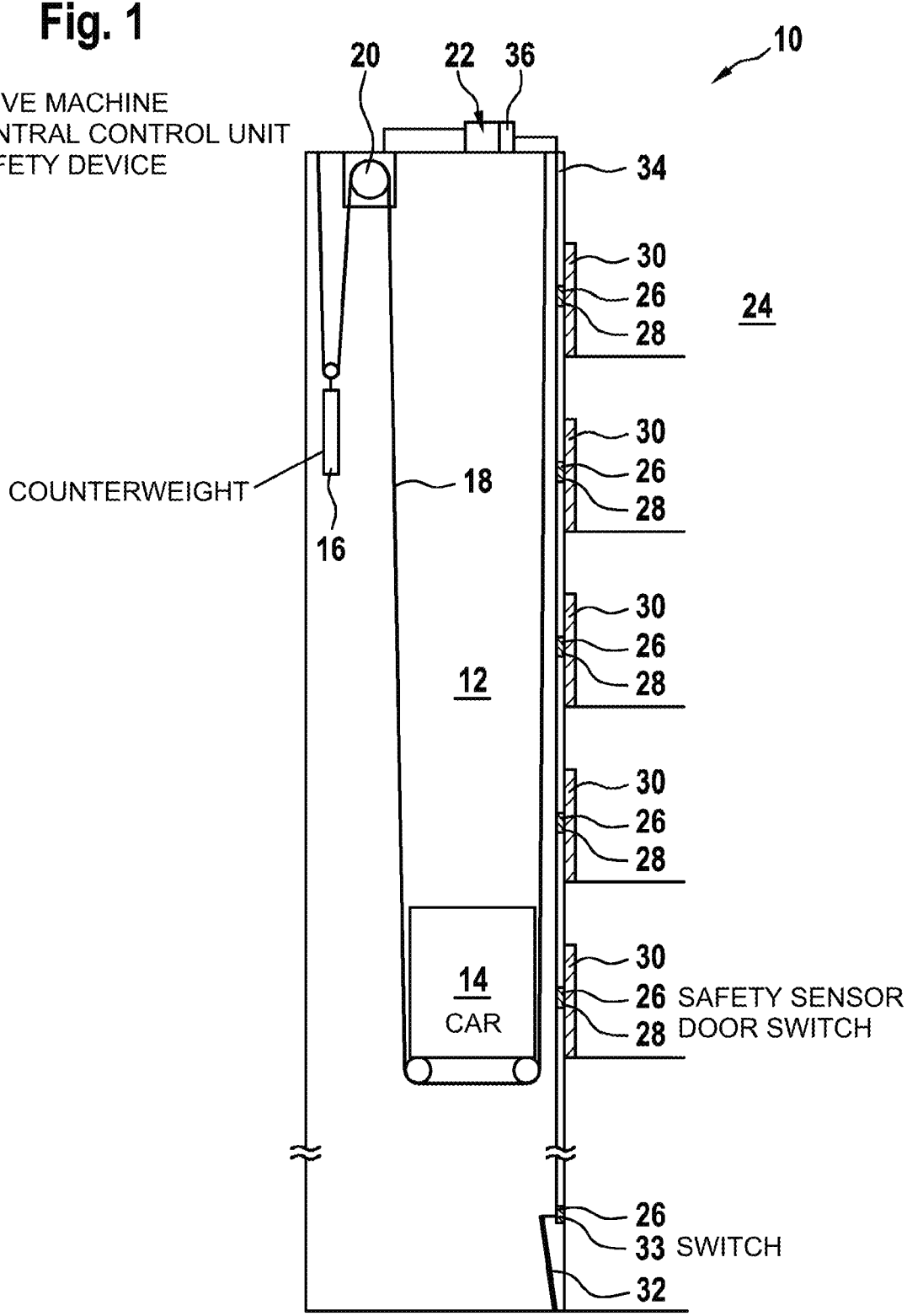
FIG. 1 schematically shows a building-related passenger conveyor system in the form of an elevator system having a safety device according to an embodiment of the invention.

FIG. 1 shows a building-related passenger conveyor system 10 in the form of an elevator system 10. An elevator system is described below by way of example. However, it should be understood that other passenger conveyor systems 10, such as escalators or moving walkways, can also include a safety device, as described in the following.

The elevator system 10 comprises an elevator shaft 12, in which an elevator car 14 and a counterweight 16 can be moved. For this purpose, the elevator car 14 and the counterweight 16 are suspended on a cable-like or belt-like suspension means 18, which can be moved by a drive machine 20. The operation of the elevator system 10 and in particular the drive machine 20 can be controlled with the aid of a central control unit 22.

In order to be able to ensure correct functioning and, in particular, safety of the elevator system 10, a plurality of safety sensors 26 are accommodated in a building 24 that accommodates the elevator system 10. In this case, the safety sensors 26 are arranged distributed over the building 24. The safety sensors 26 can, for example, comprise a door switch 28 or be connected to a door switch 28, which can monitor a closure state of doors 30 of the elevator system 10, in particular of doors to building floors. Furthermore, a ladder 32 can also be mounted close to a floor or a pit of the elevator shaft 12, for example, the correct stored positioning of which ladder on a side wall of the elevator shaft 12 is monitored, for example, by means of a switch 33 which is connected to a safety sensor 26.

The safety sensors 26 can, for example, be connected to a safety device 36 via a serial bus 34, which system, based on the signals from the safety sensors 26, generates a warning signal when the signals indicate that there is a safety problem. When the controller 22 receives a warning signal, it can, for example, stop the operation of the elevator system 10 or prevent the system from starting operation.

Figure 2:
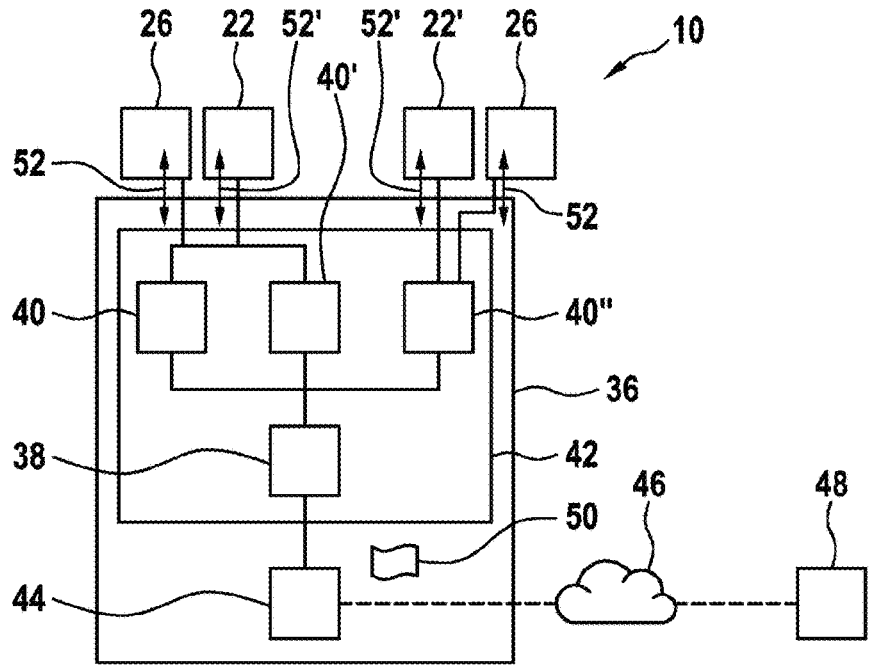
FIG. 2 shows a safety device according to an embodiment of the invention.

FIG. 2 shows a functional structure of a safety device 36 in which a plurality of software modules, such as an update module 38 and one or more safety modules 40, 40', 40", are executed by a microcontroller 42. The safety device 36 can exchange data by means of a data communication unit 44, which data is provided, for example, via the internet 46 by a provider 48, for example an internet server. In particular, the provider can provide a software package 50 for one or more of the safety modules 40, 40', 40", which can be downloaded and possibly decrypted by the update module 38 by means of the data communication unit 44. The update module 38 can then use the data from the software package 50 to update one or more of the safety modules 40, 40', 40".

The data communication unit 44 can be, for example, a router or a mobile radio unit which is connected to the safety device 36 via a local area network (LAN) or is integrated therein.

The safety modules 40, 40', 40" carry out safety-relevant functions of the passenger conveyor system 10. In doing so, they receive safety-relevant signals 52 from the safety sensors 26 and provide a warning signal 52' to the central controller 22. It is possible for there to be redundant safety modules 40, 40' which generate the warning signal 52' for the central controller 22. For example, redundant safety modules 40, 40' can monitor one another for malfunctions. For example, the same software code can be executed on different cores of the microcontroller 42 as redundant safety modules 40, 40'. Furthermore, it is possible for a further safety module 40" to generate a further warning signal 52' for a further controller 22' of the passenger conveyor system 10. For example, an elevator system having a plurality of drives 20 could have a plurality of controllers 22, 22', all of which should be stopped when a safety sensor 26 signals problems.

The various software modules, such as the safety modules 40, 40', 40" and the update module 38, can be shielded from one another in the microcontroller 42. This can be done in that some or all of the software modules are assigned their own memory regions to which other software modules are not given access and/or by restricting the data communication between the software modules.

Figure 3:
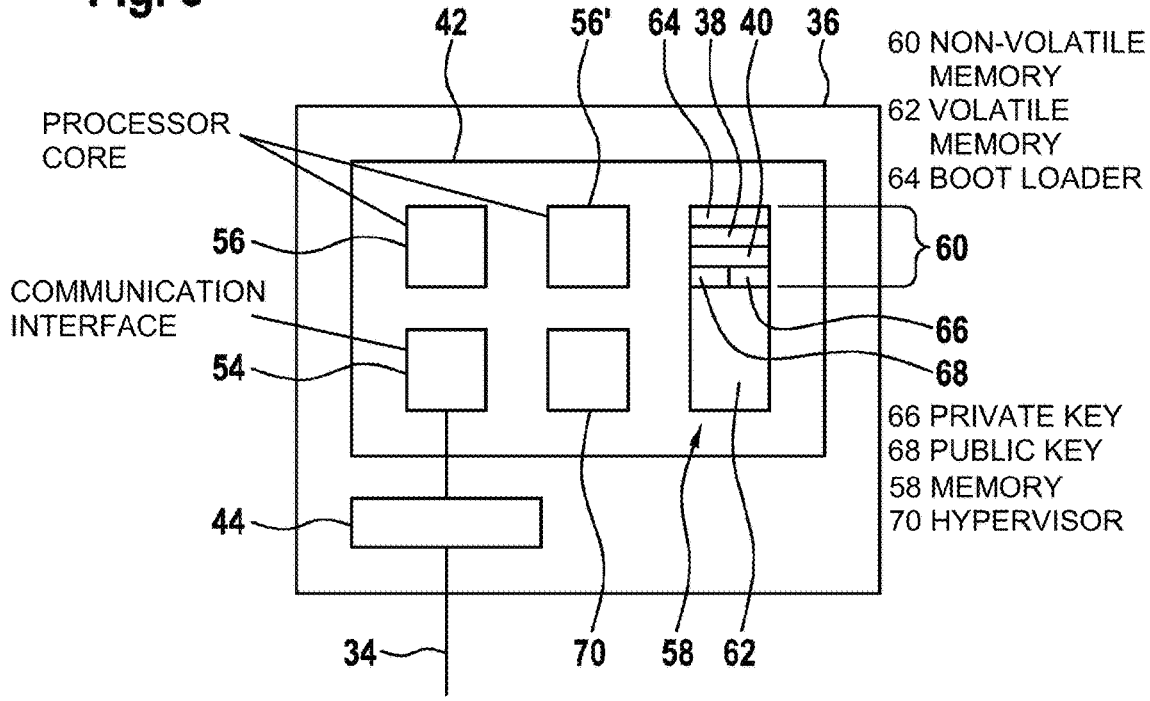
FIG. 3 shows a safety device according to a further embodiment of the invention.

FIG. 3 shows a safety device 36 and in particular the microcontroller 42 thereof in greater detail. The safety device 36 can include a data communication unit 44 via which data can be received and transmitted via the serial bus 34. These data can include the software package 50, the safety-relevant signals 52 from the safety sensors 26, and the warning signal 52' to the central controller 22.

The microcontroller 42 comprises a communication interface 54 via which the microcontroller can exchange data with the data communication unit 44. Furthermore, the microcontroller 42 can comprise a plurality of processor cores 56, 56'. The software modules 38, 40, 40', 40" can be executed on one or more of these processor cores 56, 56'.

The microcontroller 42 further comprises a memory 58, which can be made up from a non-volatile memory 60 and a volatile memory 62. Data stored in the non-volatile memory 60 remain stored when the safety device 36 or the microcontroller 42 is no longer supplied with power. The data stored in the volatile memory 62 can be lost in the process.

For example, the non-volatile memory 60 can be a protected memory that can only be changed with a mechanical intervention in the safety device 36 (such as opening a housing).

A boot loader 64, the update module 38, and one or more safety modules 40 can be stored in the non-volatile memory 60. The update module 38, which is stored in encrypted form in the non-volatile memory 60, can be decrypted with the boot loader 64 which can be called up when the safety device 36 is started.

A private key 66 for the safety device 36 and/or a public key 68 of the provider 48 of the software package 50 can also be located in the non-volatile memory 60. It is possible that only, i.e. solely the memory regions in which the boot loader 64 and the keys 66, 68 are stored, are protected as described above.

The update module 38 can be decrypted with the private key 66. The provider 48 can, for example, be authenticated with the public key 68 when a data communication is established therewith.

The microcontroller 42 is now configured in such a way that the safety module 40 is only, i.e. solely, able to be amended by the update module 38. In this way, unintentional or unauthorized changes to the safety module 40 can be prevented or at least made more difficult. In the following, only the safety module 40 is discussed. It should be understood that the other safety modules 40', 40" can also always be meant.

One possible configuration of the microcontroller 42 is that the safety module 40 is executed on the first processor core 56 and that the update module 38 is executed on the second processor core 56', wherein the access of the second processor core 56' is restricted to regions of the memory 58 in which the safety module 40 is stored. This can be achieved, for example, in that each of the processor cores 56, 56' is assigned its own exclusive memory region to which the other processor core 56, 56' has no access.

The microcontroller 42 can furthermore have a hypervisor 70 which restricts access from the executed software modules 38, 40 to the memory 58. The hypervisor 70 can be a hardware component of the microcontroller 42. However, it is also possible that the hypervisor 70 is a software module stored in the memory 58. The hypervisor 70 can be configured in such a way that it restricts access by software modules 38, 40 to the memory 58 and/or data communication between the software modules 38, 40 with one another and/or with the communication interface 54.

For example, the hypervisor 70 can restrict access of the update module 38 to regions of the memory 58 in which the safety module 40 is stored.

Figure 4:
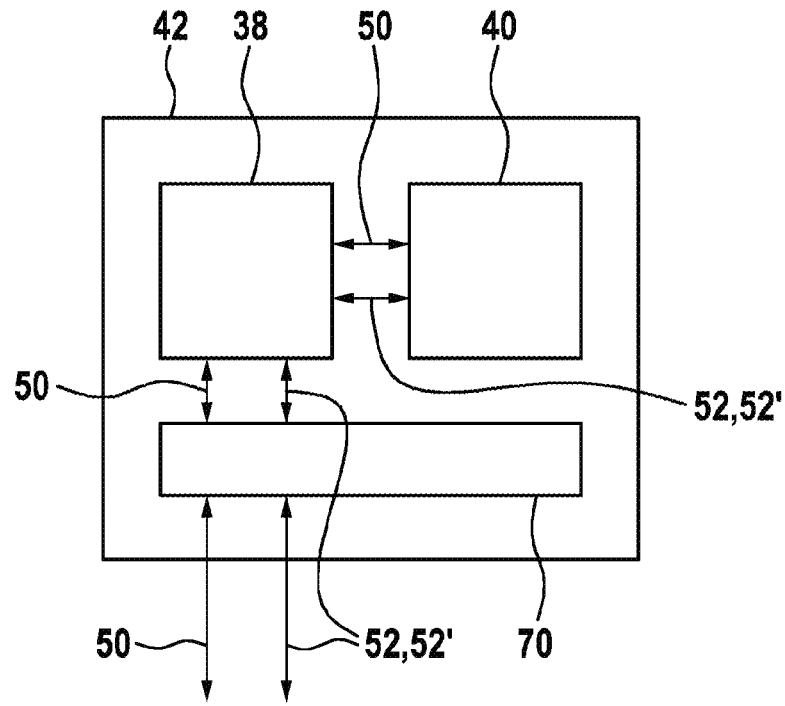
FIG. 4 shows a microcontroller for a safety device according to a further embodiment of the invention.
Figure 5:
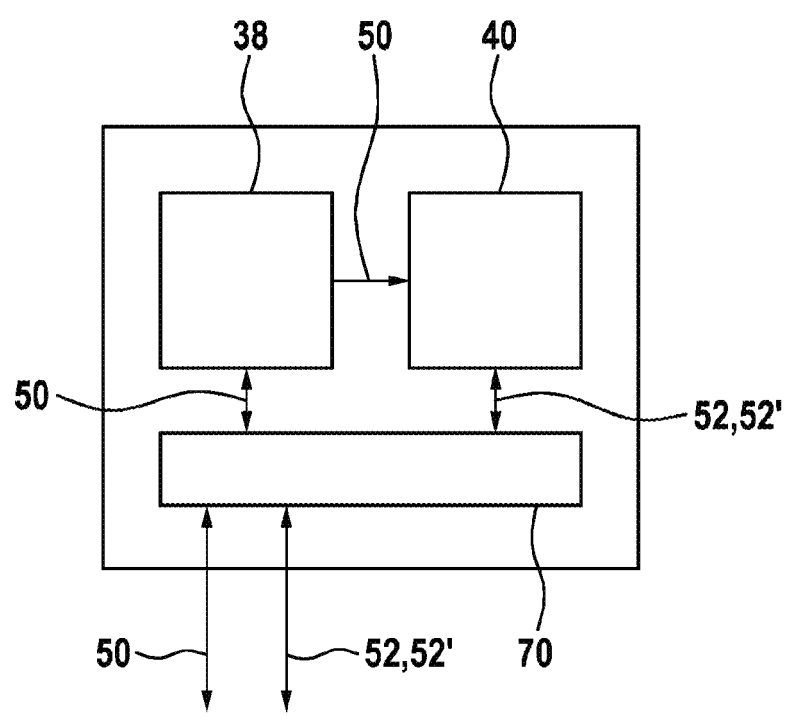
FIG. 5 shows a microcontroller for a safety device according to a further embodiment of the invention.

FIGS. 4 and 5 show embodiments of the microcontroller 42 in which the communication between the software modules 38, 40 is restricted by the hypervisor 70. It should be understood that the software modules 38, 40 can be executed in the same or in different processor cores and/or that the memory regions to which they have access can also be restricted.

FIG. 4 shows an example of a microcontroller 42 in which the external communication is limited to the update module 38 by means of the hypervisor 70. The hypervisor 70 forwards the complete communication via the communication interface 54 to the update module 38. In addition, the hypervisor 70 prevents communication of the safety module 40 via the communication interface. The update module 38 receives the safety-relevant signals 52 and forwards them to the safety module 40. Conversely, the safety module 40 transmits the warning signal 52' to the update module 38, which forwards the warning signal 52' via the communication interface 54. In addition, the update module 38 can update the safety module 40 with the data from the software package 50.

In the example of FIG. 5, the hypervisor 70 restricts the communication of the respective software module 38, 40 to the data that it is allowed to transmit and receive. The hypervisor 70 forwards the safety-relevant signals 52 from the sensors 26 of the passenger transport system 10 to the safety module 40 and also forwards the warning signal 52' to the communication interface 54. In addition, the hypervisor 70 forwards the software package 50 to the update module 38. It is not possible for the update module to generate a warning signal 52'. The update module 38 can update the safety module 40 with the data from the software package 50. However, it is not possible for the safety module 40 to change data or code of the update module 38.

Figure 6:
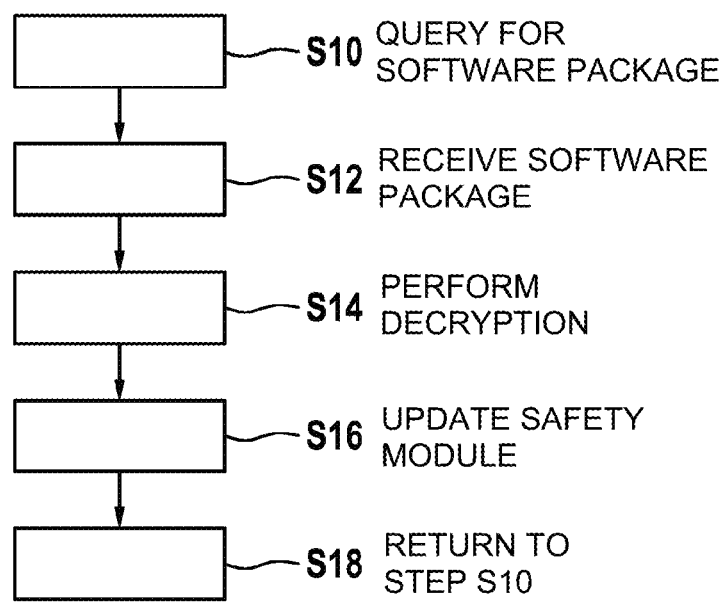
FIG. 6 shows a flow chart for a method for updating software of a safety device according to an embodiment of the invention.

FIG. 6 shows a flow chart for a method for updating software of a safety device 36, as shown, for example, in the preceding drawings.

In step S10, the update module 38 regularly queries the provider 48 via the external interface as to whether the software package 50 is available. This can occur once a day, for example. In this case, the provider 48 of the updated software 50 can also be authenticated, i.e. it can be checked whether the provider 48 is really the provider from which software package 50 is to be requested. The authentication can be carried out using the public key 66, for example.

For example, the provider 48 can be a server which is provided by a manufacturer and/or those responsible for the maintenance of the system 10 for software updates.

If there is updated software, a corresponding software package 50 is received from the update module 38 via the communication interface 54 in step S12. For example, a header of the software package 50 can first be received, in which information about the scope of the software to be updated is stored. It is possible that not all of the software but only parts of it should be updated. This can be stored in the header.

It is also possible that the software package 50 and/or the updated software thereof, are encrypted using a symmetric encryption method. The associated temporary key can be determined for this purpose by means of the two keys 66, 68.

If the software package 50 or parts thereof are encrypted, the update module 38 performs the decryption in step S14.

In step S16, the software of the safety module 40 to be updated is replaced by the update module. The corresponding memory regions of the non-volatile memory 60 can be overwritten. In step S18, the method then returns to step S10 to resume the regular query.

Finally, it should be noted that terms such as "comprising," "including," etc. do not preclude other elements or steps, and terms such as "a" or "an" do not preclude a plurality. It must further be noted that features or steps that have been described with reference to one of the above embodiments can also be used in combination with other features or steps of other embodiments described above.

In accordance with the provisions of the patent statutes, the present invention has been described in what is considered to represent its preferred embodiment. However, it should be noted that the invention can be practiced otherwise than as specifically illustrated and described without departing from its spirit or scope.

The invention claimed is:

1. A safety device for a building-related passenger transport system, the safety device comprising:
   a microcontroller having a memory, a processor and a communication interface;
   a safety module stored in the memory and, when executed on the processor, the safety module receives safety-relevant signals from components of the passenger transport system, evaluates the safety-related signals with regard to a predetermined safety problem, and transmits a warning signal to a controller of the passenger transport system when the safety-related signals indicate the safety problem;
   an update module stored in the memory and, when executed on the processor, the update module receives a software package via the communication interface and updates at least parts of the safety module with the software package;

wherein the microcontroller is configured such that the safety module is only able to be amended by the update module;

wherein the processor has a first processor core on which the safety module is executed;

wherein the processor has a second processor core on which the update module is executed; and wherein the microcontroller restricts access of the second processor core to regions of the memory in which the safety module is stored.

2. The safety device according to claim 1 wherein the microcontroller includes a hypervisor that restricts access of the executed update module and the executed safety module to the memory and restricts access of the update module to the regions of the memory in which the safety module is stored.

3. The safety device according to claim 2 wherein the hypervisor is a hardware component of the microcontroller.

4. The safety device according to claim 2 wherein the hypervisor is a software module stored in the memory.

5. The safety device according to claim 2 wherein the hypervisor forwards the safety-relevant signals from components of the passenger transport system to the safety module and forwards the software package to the update module.

6. The safety device according to claim 1 wherein the update module receives the safety-relevant signals via the communication interface and forwards the safety-relevant signals to the safety module.

7. The safety device according to claim 1 including a plurality of the safety module stored in the memory and wherein the update module updates each of the safety modules.

8. The safety device according to claim 1 wherein the memory includes a non-volatile memory and a volatile memory.

9. The safety device according to claim 8 wherein the update module is stored in the non-volatile memory in encrypted form, and including a boot loader module stored in the non-volatile memory that, when executed on the processor, decrypts the update module and loads the decrypted update module into the volatile memory.

10. The safety device according to claim 1 including at least one of a private key stored in a protected non-volatile memory of the microcontroller and a public key of a provider of the software package stored in the protected non-volatile memory of the microcontroller.

11. The safety device according to claim 10 wherein the microcontroller uses the private key to decrypt the update module and uses the public key to authenticate a provider of the software package.

12. A method for updating software of the safety device according to claim 1, the method comprising the steps of:
   authenticating a provider of the software package via the communication interface by the update module;
   receiving the software package via the communication interface by the update module; and
   updating at least a part of the safety module with the software package by the update module.

13. The method according to claim 12 including a step of decrypting the software package by the update module.

14. The method according to claim 13 wherein the software package is at least partially encrypted using a symmetric encryption method.

15. The method according to claim 12 including the update module making regular requests for a software package for updating the safety module to the provider.

* * * * *